(12) United States Patent
Griffin et al.

(10) Patent No.: US 8,303,461 B2
(45) Date of Patent: Nov. 6, 2012

(54) MACHINE ELEMENT

(75) Inventors: Joseph T. Griffin, Matthews, NC (US); Charles M. Schwab, Fort Mill, SC (US); Alfred Thomas, Mint Hill, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 101 days.

(21) Appl. No.: 12/791,468

(22) Filed: Jun. 1, 2010

(65) Prior Publication Data
US 2010/0304919 A1 Dec. 2, 2010

Related U.S. Application Data

(60) Provisional application No. 61/183,253, filed on Jun. 2, 2009.

(51) Int. Cl.
*F16H 57/08* (2006.01)
(52) U.S. Cl. ...................................................... 475/331
(58) Field of Classification Search ................... 475/331, 475/348, 159, 160, 161, 231; 184/6.12; 74/85, 74/6, 52; 464/183; 29/463
See application file for complete search history.

(56) References Cited

U.S. PATENT DOCUMENTS

| | | | |
|---|---|---|---|
| 1,039,673 A | | 9/1912 | Schatz et al. |
| 1,632,787 A | * | 6/1927 | Crawford ...................... 475/231 |
| 1,756,939 A | * | 5/1930 | Crawford ...................... 475/231 |
| 3,369,388 A | * | 2/1968 | Jepson ........................ 72/370.24 |
| 3,470,720 A | * | 10/1969 | Campbell et al. ................. 72/69 |
| 3,536,368 A | | 10/1970 | Eklund et al. |
| 3,599,307 A | | 8/1971 | Campbell et al. |
| 4,186,696 A | * | 2/1980 | Linsenmann ............... 123/90.61 |
| 4,369,667 A | * | 1/1983 | Kemper ............................ 476/8 |
| 4,389,908 A | * | 6/1983 | Dudek ............................ 475/90 |
| 5,074,426 A | * | 12/1991 | Goodhart et al. ............. 220/4.24 |
| 5,102,379 A | * | 4/1992 | Pagluica et al. ............... 475/331 |
| 5,720,246 A | * | 2/1998 | Griffin et al. ............... 123/90.61 |
| 6,254,488 B1 | * | 7/2001 | Hill .................................... 464/180 |
| 6,609,649 B1 | * | 8/2003 | Barnholt et al. ............... 228/171 |
| 8,162,969 B2 | * | 4/2012 | Brister et al. .................. 606/196 |
| 2004/0038771 A1 | * | 2/2004 | Fox ................................ 475/348 |
| 2006/0205558 A1 | * | 9/2006 | Ploetz et al. .................. 475/331 |
| 2007/0111846 A1 | * | 5/2007 | Metten et al. ................. 475/331 |
| 2007/0202986 A1 | * | 8/2007 | Kotani et al. ................. 475/331 |

FOREIGN PATENT DOCUMENTS

| | | |
|---|---|---|
| DE | 2014419 A1 | 10/1970 |
| DE | 243739 A1 | 3/1987 |
| DE | 196 06 732 A1 | 9/1996 |
| DE | 195 11 963 A1 | 10/1996 |
| DE | 197 25 453 A1 | 2/1998 |
| DE | 100 13 878 A1 | 9/2001 |
| DE | 69705511 T2 | 4/2002 |
| DE | 101 50 093 C1 | 8/2002 |
| DE | 103 05 074 A1 | 8/2004 |
| DE | 10 2005 038 656 A1 | 8/2006 |
| DE | 10 2007 031 726 A1 | 1/2009 |
| EP | 0054852 A1 | 6/1982 |
| EP | 0476395 A2 | 3/1992 |
| JP | 2008213692 A * | 9/2008 |
| WO | 2008120500 A1 | 10/2008 |

* cited by examiner

*Primary Examiner* — David D Le
*Assistant Examiner* — Lillian Nguyen
(74) *Attorney, Agent, or Firm* — Lucas & Mercanti, LLP; Klaus P. Stoffel

(57) ABSTRACT

A machine element that has at least one rotationally symmetrical section which is configured like a hollow body. In the machine element at least the rotationally symmetrical section is formed from two elements of bowl-shaped design which close the machine element on the end side and in the process enclose at least one cavity.

6 Claims, 2 Drawing Sheets

MACHINE ELEMENT

This application claims the priority of 61/183,253 filed Jun. 2, 2009, which is incorporated by reference herein.

FIELD OF THE INVENTION

The invention relates to a machine element having at least one rotationally symmetrical section which is configured like a hollow body.

BACKGROUND OF THE INVENTION

A machine element of this type in the form of a rotationally symmetrical planetary pin, on which a machine part in the form of a planetary gear is mounted, is described in DE 10 2007 031 726 A1. The planetary pins have to have a low weight and are therefore provided on the inside with chambers which are divided from one another by stabilizing ribs. Lubricating oil is to be guided to the bearing points of the planetary drive via the interior of the planetary pins, in this case, that is to say, via the chambers. The planetary pins of the prior art are therefore relatively complex to produce.

A further machine part of the type which forms the generic type in the form of a transmission shaft which is formed integrally with gearwheels is described in DE 195 11 963 A1. The shaft is produced by cold forming by means of pressure forming. Such rotationally symmetrical machine elements made from sheet metal which are hollow on the inside permit low degrees of freedom in the design of their shaped elements, since they have to have axial demolding openings for pulling them off from or out of the forming die after the forming operations. Accordingly, these machine elements are of relatively simple configuration and have to be complemented in additional machining steps by further functional elements. The gearwheels which are open on one side are loaded by the tooth engagement with at least one further gearwheel. In order to ensure appropriate rigidity of the gearwheels under load, the gearwheels are open on one side and the material for their production has to be of correspondingly thick configuration, with the result that relatively high material costs and high forces during the forming are produced. In turn, the latter has a disadvantageous effect on the die costs.

OBJECT OF THE INVENTION

It is therefore the object of the invention to provide a machine part, by way of which the abovementioned disadvantages can be avoided and which can be produced simply and inexpensively.

SUMMARY OF THE INVENTION

The machine element according to the invention is provided with at least one section which is rotationally symmetrical with respect to its axis of symmetry and is hollow on the inside. The axis of symmetry runs in an axially oriented manner. At least the rotationally symmetrical section is formed from two elements of bowl-shaped design. The elements of bowl-shaped configuration close the machine element on the end side and in the process preferably enclose a cavity between them. The elements are produced without the removal of material by forming and are fastened axially next to one another for this section.

Bowl-shaped elements are elements with a casing which is rotationally symmetrical about a rotational axis, are closed on one side by way of a base and have an opening on the side which lies opposite the base.

The rotationally symmetrical casing may be of any desired design, for example arched outward in the shape of a barrel or arched inward like a hyperboloid. However, the outer contour is preferably formed by a continuous outer cylindrical circumferential surface or by a plurality of outer cylindrical surface sections of different diameter, or, however, can have, as an alternative, any desired shaped and functional elements such as toothing systems, spanner flats, polygonal profiles or the like. As an alternative, the outer contour is formed by sections which have combinations of different ones of the abovementioned shaped and functional elements.

The base is penetrated in its center by the rotational axis and is arched concavely inward or arched convexly outward, or as an alternative is of disk-shaped configuration. As an alternative, the base may also extend in a conically configured manner or be formed by a plurality of cylindrical sections which follow one another and the diameters of which get smaller and smaller toward the end of the rotationally symmetrical machine element. Designs of the base are also conceivable, in which a plurality of the abovementioned geometric shapes are combined with one another. The base may be perforated centrally or have a plurality of holes.

The opening is preferably described by an internal diameter and in the process is preferably enclosed by a hollow-cylindrical section. The diameter may be smaller or greater than that of inner cylindrical sections which are axially adjacent to the opening.

The machine element is assembled from elements which are either identical parts with mutually identical shapes and dimensions or are different from one another with regard to shaped elements and/or dimensions.

The elements, from which the machine element is assembled, differ with regard to the materials from which they are manufactured, or are made from the same material. Preferred materials are steels.

Both or more than two elements are preferably provided with in each case one outer cylindrical partial surface, which in each case have the same diameter as that of the other element. The elements are fastened to one another in such a way that a hollow machine element is produced. Machine elements are elements such as shafts, gearwheels and journals and preferably planetary pins for mounting a planetary gear in a planetary drive.

The bowl-shaped elements are preferably produced from semifinished products, such as from metal sheets, tube or rod material made from steel, by cold forming such as drawing, hydroforming, working, tumbling or impact extruding, or combinations of processes of this type. The hardened elements are joined to one another. As an alternative, first the at least partially hollow machine element which is initially assembled from the non-hardened elements is hardened. All hardenable carbon steels or steels with a low carbon content which, after being joined by welding, can be, for example, case-hardened, nitrided or hardened by other suitable processes are suitable as materials for the elements.

The elements bear against one another on the end side at the joining point or are plugged into one another at the end-side sections.

The outer cylindrical surface/surfaces is/are ground on the outside either before or after the elements have been assembled to form the machine element.

As an alternative, the surface of the cylindrical surfaces keeps the quality which it has after forming without the removal of material.

Stamped recesses or holes in one or both elements assist the direction-oriented assembly. Apart from assembly aids, holes also form passages for lubricating oil. The cavity can be used as lubricant reservoir.

The advantages of machine elements of this type according to the invention lie, in particular, in their simple and inexpensive production, in the low weight and in their versatile use. Since the machine elements are assembled, relatively complicated contours can be produced with low outlay by the fact that different individual structures of the complicated contour can be produced on different ones of the elements which are manufactured separately from one another, and can then be assembled to form the machine element with the complicated contour. Moreover, the elements can be combined with one another according to the modular principle in any desired way to form different machine elements.

Machine elements of this type are, for example, shafts of transmissions, on which outer cylindrical sections are formed as bearing points or raceways for mounting the transmission shaft in a vehicle transmission and which are integral with gearwheels. Further elements are, for example, gearwheels or shaft steps which are formed without the removal of material and are then fastened to one another axially.

A further refinement of the invention provides for the machine element to be a planetary pin which is assembled from at least two of the elements and on which at least one planetary gear (gearwheel) is mounted rotatably. The planetary pin which is rotationally symmetrical at least on the outside with respect to its axis of symmetry has, on the outside, an outer cylindrical circumferential surface as raceway of at least one bearing of the planetary gear. The planetary pin is assembled from two bowl-shaped elements which are both produced without the removal of material, are fastened directly to one another and which delimit a cavity in the interior of the planetary pin.

The two bowl-shaped elements of the planetary pin are formed from a casing and a base and are connected to one another at their openings by means of welding, it being possible for any desired known welding processes to be used to connect the bowl-shaped elements.

The weight of planetary gear mechanisms of this type is reduced in comparison with comparable gear mechanisms of the prior art, since the planetary pins have a low weight. Since the planetary gears circle around a central axis of the planetary drive, the inertial forces in the planetary drive are reduced considerably on account of the reduced mass of the hollow planetary pins. The planetary pins are nevertheless stable enough on account of the design which is closed on the end side. The stability is defined via the thickness of the wall of the hollow planetary pins which may be identical all the way around, but as an alternative also has sections with wall thicknesses which differ from one another.

However, the design which is closed on the end side does not preclude the presence of holes, through which lubricating oil can pass into the interior of the planetary pins and, during operation of the planetary gear mechanism, can be guided out again directly to the planetary bearing by the influence of centrifugal force. Additionally, or as an alternative to this, the holes are orientation aids during the assembly of the elements to form the planetary pin or during the assembly of the planetary pin into the planetary drive. As an alternative, holes in the planetary pin serve as a plug-in connection with a securing pin, by way of which the planetary pin is secured axially and circumferentially on a planetary carrier.

BRIEF DESCRIPTION OF THE DRAWING DRAWINGS

In the following text, the invention will be explained in greater detail using some exemplary embodiments. In the drawing.

Figure 6:
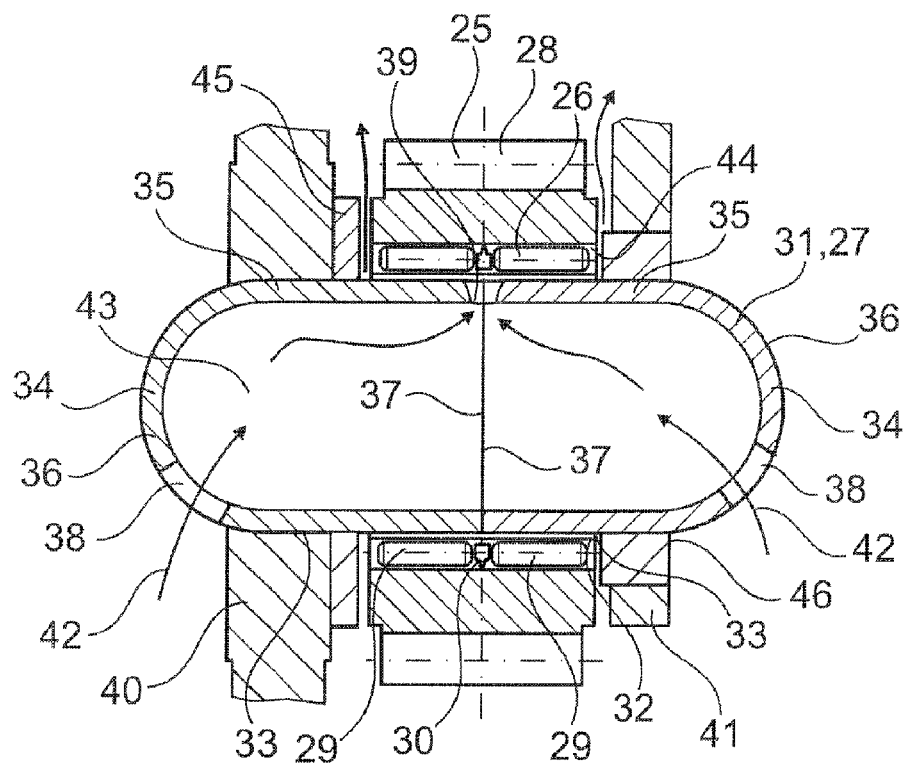
Figure 7:
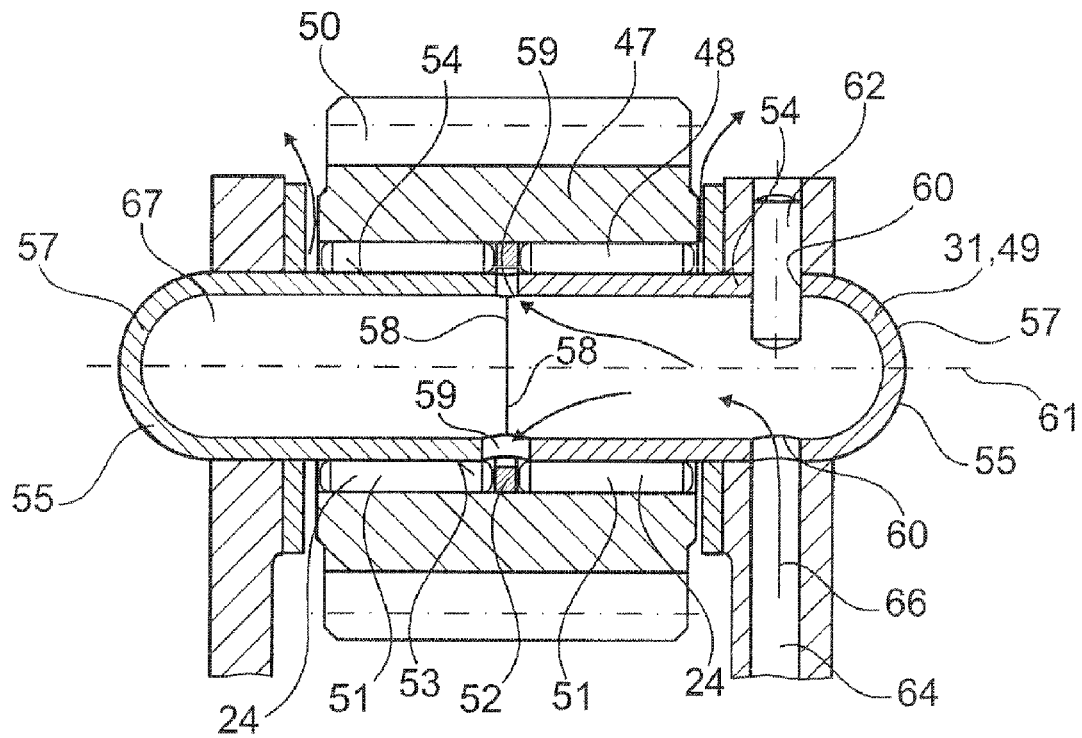

FIG. 6 shows a detail of a planetary drive, with which the arrangement of a planetary gear on a planetary carrier, in which the planetary pin is formed by the machine element according to the invention, is shown in a longitudinal section; and FIG. 7 shows a detail of a further planetary drive, with which the arrangement of a planetary gear on a planetary carrier, in which the planetary pin is formed by the machine element according to the invention, is shown in a longitudinal section.

DETAILED DESCRIPTION OF THE DRAWING INVENTION

Figure 1:
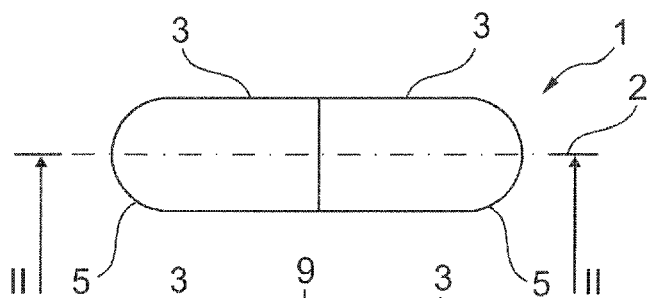
FIG. 1 shows one exemplary embodiment of a machine element according to the invention, in a side view.
Figure 2:
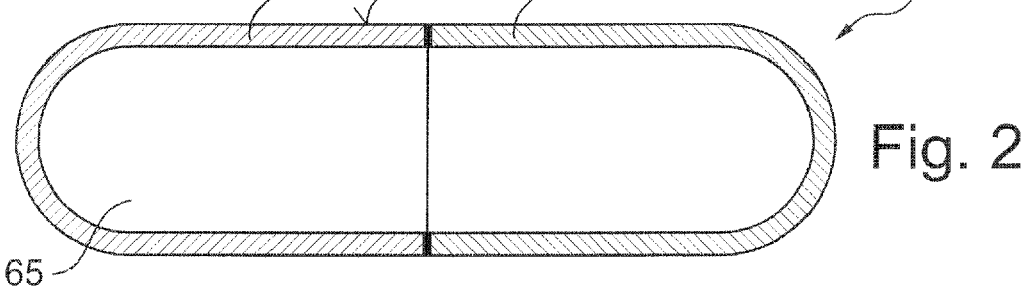
FIG. 2 shows a longitudinal section through the machine element along the line II-II which is the axis of symmetry of the machine element.
Figure 3:
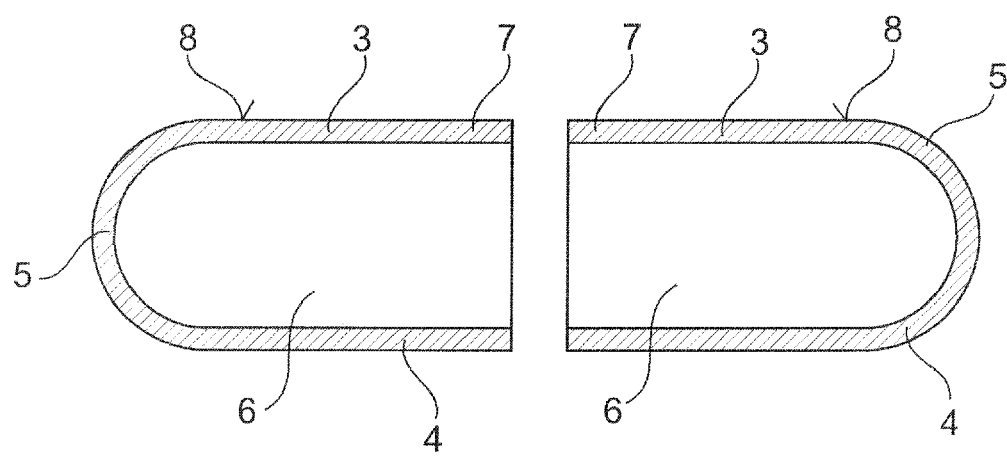
FIG. 3 shows the two elements of the machine element according to FIG. 1 as individual parts, before they are connected to one another.

FIGS. 1, 2 and 3—FIG. 1 shows a machine element 1 which may be configured as a planetary pin, in a side view. FIG. 2 shows a longitudinal section along the axis of symmetry 2 of the machine element 1 of rotationally symmetrical configuration. The machine element 1 is assembled from two elements 3 and is closed axially on the end sides by the bases 5. The elements 3 together enclose a cavity 65.

The elements 3 are shown as individual parts in FIG. 3 and are formed in a bowl-shaped manner with a rotationally symmetrical hollow-cylindrical casing 4, or sidewalls and a convexly hemispherically formed base 5 and identical parts which are drawn from thin-walled sheet metal. The edge zone 7 on the elements 3, which adjoins the respective opening 6, is trimmed and therefore rough, since at first a radially projecting collar-shaped edge induced by drawing technology had been formed on it, from which the elements 3 had to be freed after drawing.

In each case on the casing 4 on the outside, the elements 3 have a partial surface 8 of outer cylindrical configuration which, after the positively locking connection of the elements 3 to form the component 1 and after the outer cylindrical grinding of the casing, form a common outer cylindrical surface 9. As a result of the grinding, the rough edge zone 7 and a possible bead which is produced by the two parts being welded to one another are removed, with the result that the surface 9 is produced which may form a raceway for the rolling bodies of a planetary bearing.

Figure 4:
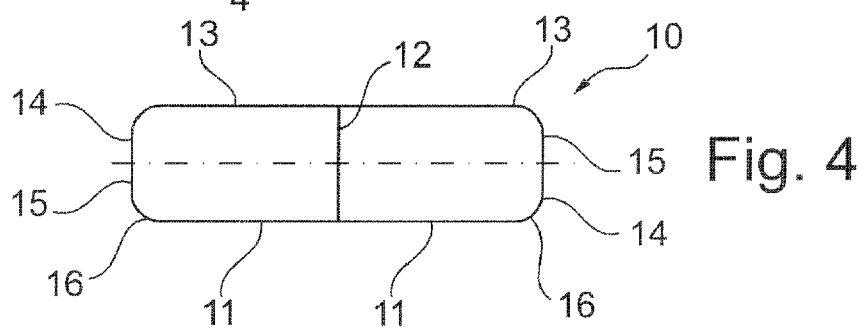
FIG. 4 shows a further exemplary embodiment of a machine element according to the invention.

FIG. 4—FIG. 4 shows a further exemplary embodiment of a machine element 10 which is formed from two elements 11 which are connected to one another in the plane 12, for example by means of a welded connection. The bowl-shaped elements 11 are identical parts and are formed in each case from a rotationally symmetrical casing 13 and a base 14. The base 14 has a flat disk-shaped region 15 and a circumferential convexly curved zone 16, via which the base 15 and the casing 13 merge into one another.

Figure 5:
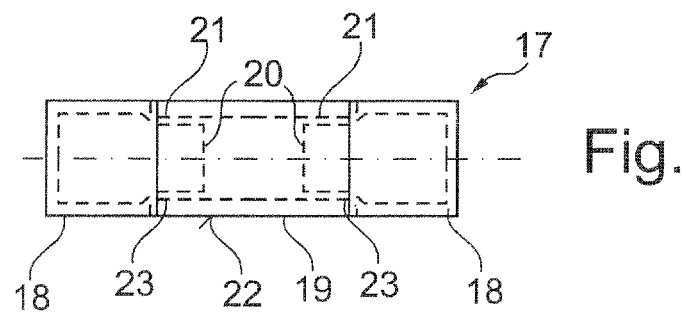
FIG. 5 shows a further exemplary embodiment of a machine element according to the invention.

FIG. 5—FIG. 5 shows a machine element 17 which is plugged together from two elements 18 and from an element 19. The central element 19 is hollow-cylindrical. The two outer elements 18 are of bowl-shaped configuration and close the component 17 on the end sides. The inner contour of the elements is shown using dashed lines. The respective edge 20 (shown dashed) of each of the elements 18 is drawn in radially and has a cylindrical seat 21, by way of which the respective element 18 is pressed on the inside into the hollow-cylindrical element 19. The elements 18 and 19 together form an outer cylindrical circumferential surface 22 which is interrupted at most by two joints 23 with small dimensions. As an alternative, the respective joint 23 is filled with additional material by welding and is smoothed to the level of the circumferential surface 22 by means of grinding.

FIG. 6—FIG. 6 shows an arrangement of a planetary gear 25 of a planetary drive (not shown in further detail) in a longitudinal section. The planetary gear 25 is mounted rotatably on a machine element 31 of the invention in the form of a planetary pin 27 by means of a double-row anti-friction bearing 26. The planetary gear 25 is, for example, a classic gearwheel with a spur toothing system 28. The anti-friction bearing 26 has two rows of needles 29 and a cage 30. The needles 29 are held at a spacing from one another circumferentially and axially by way of the cage 30 (not shown in greater detail). During operation of the planetary drive, the needles 29 roll on an outer cylindrical surface 32 which is assembled from the partial surfaces 33. In each case one of the partial surfaces 33 is formed on one half of the planetary pin 27. Each of the halves is formed by an element 34 of bowl-shaped form.

The bowl-shaped elements 34 in each case have a casing 35 of hollow-cylindrical configuration and a base 36 of hemispherical design and are welded to one another bearing against to one another at their openings 37. The bases 36 close the planetary pin 27 in both axial directions, with the result that a cavity 43 is formed, but the planetary pin has two holes 38 and a further hole 39.

In the initial state, in each case half the hole 39 is formed as, for example, a crescent-shaped cutout on each bowl-shaped element 34. The hole 39 is not actually formed until the halves are brought together. The holes 38 are assembly aids during the connection of the bowl-shaped elements 34 by way of which it is ensured that the crescent-shaped cutouts meet one another precisely when the halves are brought together. To this end, for example, the two bowl-shaped elements 34 can each be oriented with respect to one another in an apparatus by means of a mandrel which engages into in each case one of the holes 38, in such a way that the crescent-shaped cutouts meet one another in order to form the hole 39.

The planetary pin 27 is pressed into the walls 40 and 41 in such a way that the hole 39 in the planetary drive faces radially to the outside away from the central axis (not shown) of the planetary drive, which central axis lies below the illustration in FIG. 6. The openings 38 are open in the opposite direction. During operation of the planetary drive, oil or oil mist will pass in the direction of the arrows 42 through the holes 38 into the cavity 43 and is conveyed from there through the opening 39 directly axially between the two rows of needles 29 of the anti-friction bearing 26 on account of the centrifugal force. The oil therefore comes directly into contact in each case with the needles 29 between the outer cylindrical surface 32 or the inner cylindrical raceway 44 of the axial thrust washer 45 or the run-on sleeve 46.

At least one of the holes 38 can be an assembly aid during insertion of the planetary pin 27 into the planetary carrier. To this end, for example in an apparatus for assembling the planetary pin 27 into the carrier, a mandrel may engage into one of the holes 38 and align the planetary pin 27 with the hole 39 radially to the outside and hold them in this position until assembly is finished.

FIG. 7—FIG. 7 shows a further exemplary embodiment of an arrangement of a planetary gear 47 of a planetary drive (not shown in further detail) in a longitudinal section. The planetary gear 47 is mounted rotatably on a machine element 31 according to the invention in the form of a planetary pin 49 by means of a double-row anti-friction bearing 48. The planetary gear 47 is, for example, a classic gearwheel with a spur toothing system 50. The anti-friction bearing 48 has two solid roller sets 51 which are separated axially by an intermediate washer 52. During operation of the planetary drive, the rollers 24 of the solid roller sets 51 roll on an outer cylindrical surface 53 which is assembled from the partial surfaces 54. In each case one of the partial surfaces 54 is formed on one half of the planetary pin 49. Each of the halves is formed by an element 55 of bowl-shaped form.

The bowl-shaped elements 55 in each case have a casing 56 of hollow-cylindrical configuration and a base 57 of hemispherical design and are connected to one another bearing against one another at their openings 58. The bases 57 close the planetary pin 49 in both axial directions, but the planetary pin has two holes 59 and two further holes 60. In each case the holes 59 and in each case the holes 60 lie opposite one another at the rotational axis 61, longitudinal axis of the component 1 or the axis of symmetry of the planetary pin 49, with the result that in each case one of the holes 59 is directed radially to the outside and in each case one of the holes 60 is directed radially to the inside. The radially outwardly directed hole 60 is closed with a securing pin 62, by way of which the planetary pin 49 is secured in the planetary carrier 63 axially and against rotation. The hole 60 which lies radially opposite adjoins a lubricating channel 64, through which oil or pressurized oil which, during operation, flows radially to the outside in the direction of the arrow 66 as a result of centrifugal force, is fed into the cavity 67 of the planetary pin 49 and from there to the anti-friction bearing 48 via the openings 59.

LIST OF DESIGNATIONS

1 Component
2 Axis of symmetry
3 Bowl-shaped element
4 Casing
6 Base
7 Opening
8 Edge zone
9 Outer cylindrical part surface
10 Outer cylindrical surface
11 Component
12 Element
13 Plane
14 Casing
15 Base
16 Flat region
17 Convexly curved zone
18 Component
19 Bowl-shaped element
20 Hollow-cylindrical element
21 Drawn-in edge
22 Cylindrical seat
22 Circumferential surface 23 Joint
24 Rollers
34 Bowl-shaped element
35 Casing
36 Base
37 Opening
38 Hole
39 Hole
40 Wall
41 Wall
42 Arrow
43 Cavity
44 Inner cylindrical raceway
45 Thrust washer
46 Run-on sleeve
47 Planetary gear
48 Anti-friction bearing
49 Planetary pin
50 Spur toothing system
51 Solid roller set
52 Intermediate washer
53 Outer cylindrical surface
54 Partial surfaces
55 Bowl-shaped element
56 Casing
57 Base
25 Planetary gear
26 Double-row anti-friction bearing
27 Planetary pin
28 Spur toothing system
29 Needle
30 Cage
31 Component
32 Outer cylindrical surface
33 Partial surfaces
58 Opening
59 Hole
60 Hole
61 Rotational axis
62 Securing pin
63 Planetary carrier
64 Lubricating channel
65 Cavity
66 Arrow
67 Cavity

The invention claimed is:

1. A machine element, comprising:
at least one rotationally symmetrical section formed from a first hollow substantially U-shaped element as viewed in longitudinal cross-section, which has a linearly extending cylindrical sidewall with a first end and a second end extending parallel to a longitudinal axis of the machine element, and a closed convex base, as viewed in cross-section from a horizontal axis of the machine element, extending from the a first end of the first sidewall and crossing the longitudinal axis of the machine element; and
a second hollow substantially U-shaped element as viewed in longitudinal cross-section, which has a linearly extending cylindrical sidewall with a first end and a second end extending parallel to the longitudinal axis of the machine element, and a closed convex base, as viewed in cross-section from the horizontal axis of the machine element, extending from the first end of the first the first substantially U-shaped element and the second substantially U-shaped element are connected axially together at the second ends of the sidewalk of first and second substantially U-shaped elements so as to enclose a single cavity extending between the first substantially U-shaped element and the second substantially U-shaped element.

2. The machine element of claim 1, wherein first substantially U-shaped element and the second substantially U-shaped element are fastened directly to one another.

3. The machine element of claim 1, wherein at least one of the elements has at least one hole.

4. The machine element of claim 1, wherein at least one of the elements has, on an outside, a cylindrical circumferential surface which extends about a rotational axis.

5. A planetary pin, which is the machine element according to claim 1, the planetary pin having, on an outside, at least one outer cylindrical circumferential surface which is a raceway for mounting a planetary gear.

6. A planetary drive having planetary gears and having at lest one planetary pin which is the machine element according to claim 1, at least one of the planetary gears being mounted rotatably on the planetary pin.

* * * * *